Figure 5:
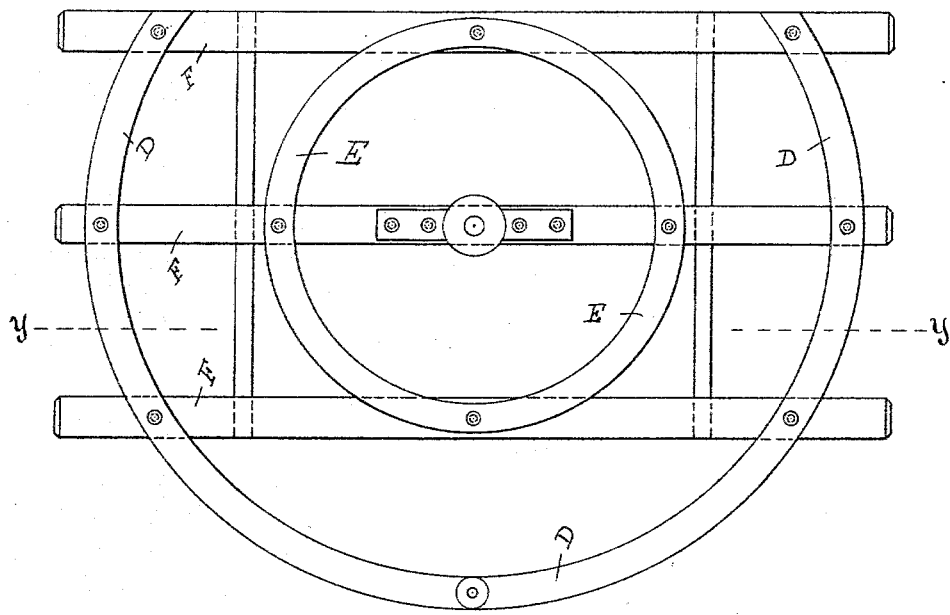

(No Model.) 3 Sheets—Sheet 1.
A. PAWELSKI.
SHORT TURNING GEAR FOR WAGONS.
No. 531,745. Patented Jan. 1, 1895.
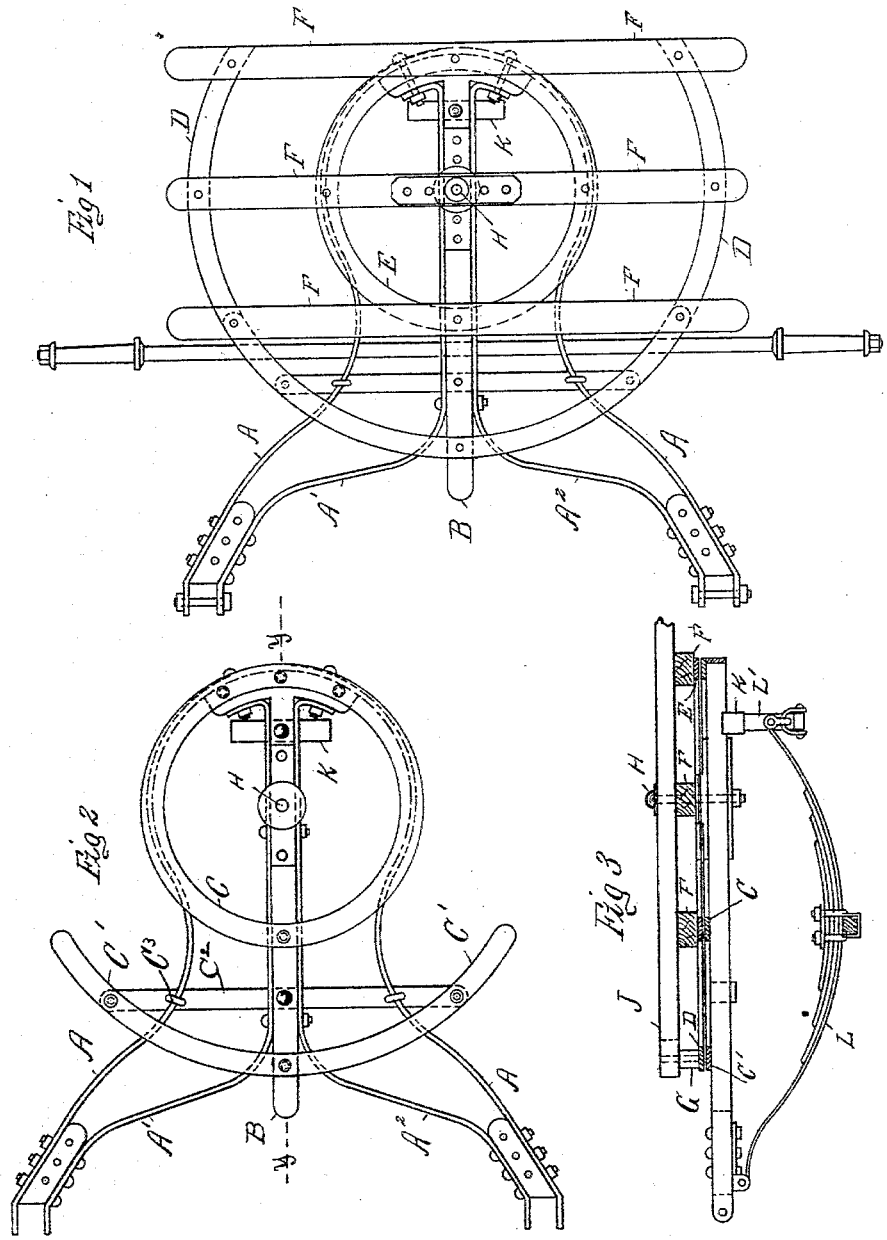
Witnesses
Alfred B. Watson
Wm. M. Drew
Inventor
Andrew Pawelski
By John F. Kerr
Atty.

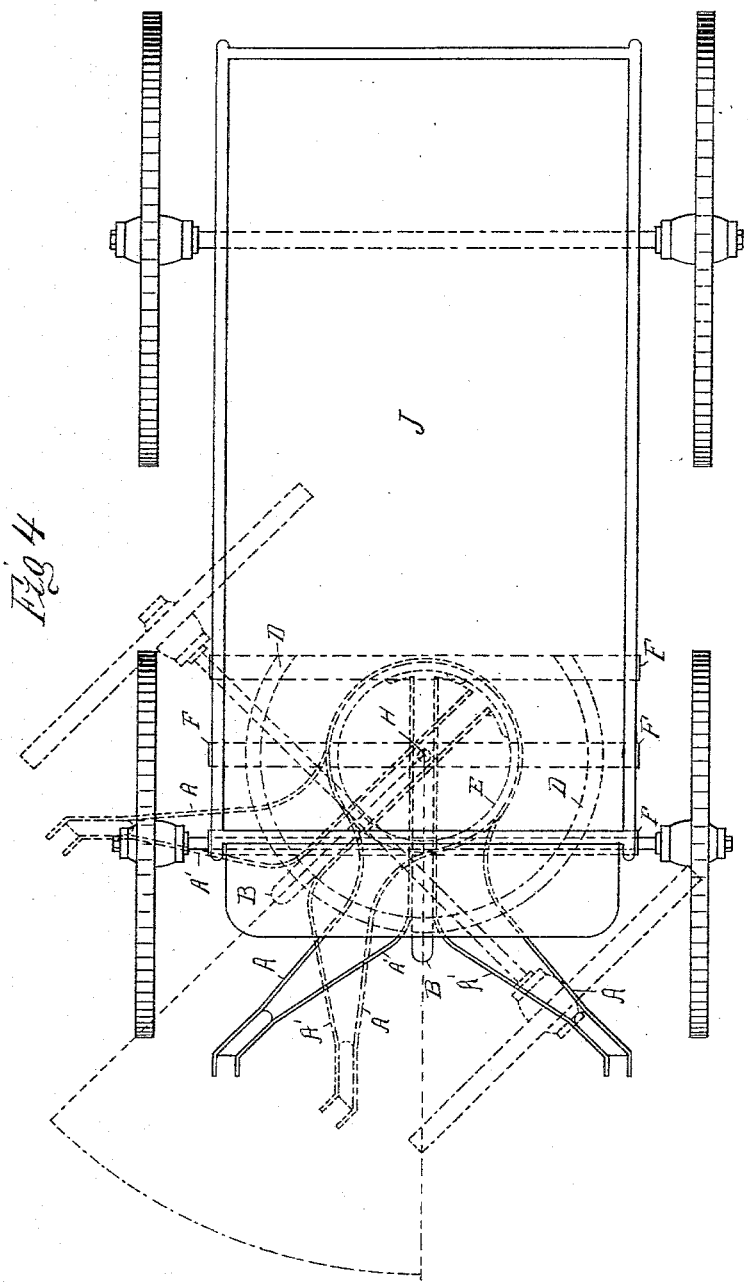

(No Model.) 3 Sheets—Sheet 3.

A. PAWELSKI.
SHORT TURNING GEAR FOR WAGONS.

No. 531,745. Patented Jan. 1, 1895.

Witnesses
Alfred B. Watson
Wm M Drew

Inventor
Andrew Pawelski
By John F. Kerr
Attorney.

UNITED STATES PATENT OFFICE.

ANDREW PAWELSKI, OF PATERSON, NEW JERSEY.

SHORT-TURNING GEAR FOR WAGONS.

SPECIFICATION forming part of Letters Patent No. 531,745, dated January 1, 1895.

Application filed July 19, 1894. Serial No. 517,969. (No model.)

*To all whom it may concern:*

Be it known that I, ANDREW PAWELSKI, a citizen of the United States, residing at Paterson, in the county of Passaic and State of New Jersey, have invented certain new and useful Improvements in Short-Turning Gear for Wagons, of which the following is a specification.

The object of my invention is, to provide a short turning gear for a full platform spring wagon which will combine simplicity, durability and strength and which will facilitate the turning of a wagon with a low body and large wheels.

The invention consists of a steel frame of new design and the locating of the fifth wheel upon the rear end of the gear, behind the front axle and overlapping the cross spring; and the employment of an arc platform or segment concentric with said fifth wheel located on the front part of the gear the radius of which is greater than the radius of said fifth wheel and a supplemental ring or circular track the radius of which is equal to the radius of the segment and resting on said segment, the upper portion of said fifth wheel and said circular shaped track being secured to a top frame as hereinafter described, and a king pin which passes through the said fifth wheel, as hereinafter described and shown in the drawings.

By the peculiar construction of my gear the weight of a load is evenly distributed over the fifth wheel, cross spring and front axle and in turning the wagon the front part of the body moves away from the wheel that is cranked for some distance as it turns on the king pin and is prevented from tipping from one side to the other.

The size of the gear will be regulated in most cases by the size of the wagon.

Figure 6:
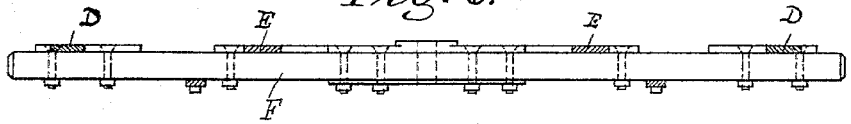

In the accompanying drawings in which similar letters of reference indicate like parts, Figure 1, is a top plan view of my turning gear showing its position in relation to the front axle. Fig. 2, is a top view of the lower portion of my gear showing the segment and lower half of fifth wheel, and method of securing the same to the frame on which it is placed the frame under the same being represented by the dotted line. Fig. 3, is a side view of a section on the line $y\ y$ showing position of fifth wheel in relation to the cross spring, side spring and axle. Fig. 4, is a plan view showing the operation of the gear in turning, by dotted lines. Fig. 5 is a bottom view of the upper portion —E— of the fifth wheel and of the supplemental wheel or circular track —D—; and Fig. 6 is a view in cross section on the line Y Y of Fig. 5.

In the drawings —B— is a longitudinal central bar the bottom of which is covered its entire length by a metallic plate to give strength thereto which plate is secured in any suitable manner.

—A— is a steel frame which passes around and under the fifth wheel and is secured thereto as shown in Figs. 1 and 2, the ends of said frame projecting to the front and side as shown. —A'— and —A²— are arms secured to the sides of longitudinal bar —B— the rear ends being bent at an angle from said longitudinal bar —B— as shown in said figures and said ends are secured by bolts to the steel frame —A— as is also shown.

—C— is the lower part of the fifth wheel and is secured to the main longitudinal bar —B— by bolts as shown in Fig. 2.

—C'— is the segment or arc which is secured in its center to the main bar —B— and near its ends to the ends of a cross bar —C²—.

—C³— are eyes secured to the cross bar C² through which the ends of the frame —A—A— pass. Said cross bar C² is secured at its center to the main bar —B—. The arms A' A² project outwards and sidewise from said main bar —B—. Blocks are placed between the ends of the arms A and A' and A and A², to which blocks the arms are fastened a short distance back from the front ends of said arms, whereby jaws for receiving the eyes of the shafts or pole are formed in front of said blocks as shown in Figs. 1 and 2.

—F—F—F— are cross bars which being suitably joined together form a top frame to which is secured underneath the same the upper portion —E— of the fifth wheel and the supplemental wheel or circular track —D— as shown in Fig. 1.

—G— is a block which is secured to the central portion of said circular track between said circular track and the wagon body to form a rest. Said block is of the same height as the bars —F—F—F— as shown in Fig. 3.

—H— is the king pin which passes through the body of the wagon, through the center bar —F—, upper and lower fifth wheels and longitudinal bar —B— as shown in Fig. 3.

—K— is a metal block to which the rear or cross spring is secured by bolts or clips. —L— is a side spring and —L'— the cross spring. Said springs are joined together in the usual manner. The front axle is also secured to the side springs in the usual manner.

—J— represents the wagon body which is secured to the cross bars —F—F—F— by bolts or in any other suitable way.

As will be seen by the drawings, referring to Fig. 1, the weight of the load in the wagon is distributed over the cross spring —L'—, the fifth wheel, over the axle, and over the segment or arc.

In operation, referring to Fig. 4, it will be seen that the weight continues to be equally distributed in the same manner, the circular track turning on the segment —C'—, the upper portion E of the fifth wheel turning on the lower portion —C—.

With this description of my invention, what I claim is—

1. In a fifth wheel the combination with a longitudinal center bar —B— of a ring secured on the top of same, at the rear end, frame A— extending around the ring and projecting from the same to the front and sidewise forming arms A'— A²— secured to said center bar and projecting to the front and sidewise from the front end of said bar, the outer ends of said arms being connected to form recesses for the coupling of the shaft or pole, all constructed substantially as shown and described.

2. In a fifth wheel the combination with a central longitudinal bar, of a ring secured on the top of the same at the rear end and a segment concentric with the ring secured on the top of the bar at the front end, a cross bar connecting the ends of the segment, arms secured to the bar and projecting toward the front and sidewise, arms secured to the ring and projecting to the front and sidewise, and attached to the cross bar of the segment and having their outer ends connected with the front ends of the arms on the central bar, all constructed substantially as shown and described and for the purposes specified.

3. In a fifth wheel, the combination with a central longitudinal bar of a ring secured on the same, arms projecting from said bar and said ring toward the front and sidewise, and blocks between the front ends of the two arms at each side of the central longitudinal lines of the fifth wheel, to which blocks the arms are fastened short distances back of the front ends of said arms, whereby jaws for receiving the eyes of the shafts or pole are formed by the ends of the arms in front of said blocks, substantially as set forth.

4. A short turning gear for a full platform spring wagon, the same consisting of the front axle, side springs, and rear cross-spring, the upper and lower rings located on gear frames in the rear of the front axle and projecting backward beyond the rear cross-spring, said gear frames extending in front of the front axle and to the rear of the back cross-spring, a segment on the lower frame or ring, a large circular track of the same radius secured to the upper frame and adapted to rest and move upon said segment, the central longitudinal bar, the steel frame secured thereto and to the lower ring, and the king bolt connecting said parts to the rear of the front axle and backward of the rear cross-spring, all substantially as herein shown and described.

5. The combination with the central longitudinal bar and the lower ring of the fifth wheel secured thereto, of the transverse bar on the central bar in front of said ring, a segment secured to said central and transverse bars, cross bars, the upper ring of the fifth wheel, and a circular track secured to the under side of said cross bars, said track being concentric with and adapted to move over said segment, substantially as described.

6. The combination with the central longitudinal bar and the lower ring of the fifth wheel secured thereto, of the transverse bar on the central bar in front of said ring, a segment secured to said central and transverse bars, cross bars, the upper ring of the fifth wheel, and a circular track secured to the under-side of said cross bars, said track being concentric with and adapted to move over said segment, and the frame A secured to the central and transverse bars and to the lower ring of the fifth wheel, substantially as described.

ANDREW PAWELSKI.

Witnesses:
JAMES ROBERTSON,
FREDERICK J. MACMAHON.